Patented Dec. 12, 1939

2,183,154

UNITED STATES PATENT OFFICE 2,183,154

PROCESS FOR PRODUCING POLYMERIZATION PRODUCTS OF ETHYLENE

Johann Sixt, Munich, Germany, assignor to Consortium Fuer Elektrochemische Industrie, G. m. b. H., Munich Germany, a corporation of Germany No Drawing. Application September 9, 1936, Serial No. 99,959. In Germany September 19, 1935

8 Claims. (Cl. 260—683)

This invention relates to polymerization products of ethylene and has for its object to provide a simple and efficient process for producing such products.

It is known that ethylene can be polymerized in the absence of water and in the presence of aluminum chloride and hydrocarbon solvents, to form viscous oils of high boiling point. Since the catalytic action of the aluminum chloride is slow under normal pressure, attempts have been made to accelerate the reaction by the addition of uranium salts as well as mercury salts, but the former are entirely too expensive for practical use and the latter are objectionable because they form highly poisonous mercury-oxygen compounds.

I have now discovered that the polymerization of ethylene, using suspended aluminum chloride as a catalyst, is greatly accelerated when water is present in amount of at least 0.5 mol $H_2O$ per mol $AlCl_3$, and at most the amount of water must be such that solid aluminum chloride remains. The acceleration of the reaction is still pronounced when using about 2 mols $H_2O$ per mol $AlCl_3$. The maximum reaction velocity appears to be reached with a content of 1.5 mols $H_2O$ per mol $AlCl_3$.

I have further found that the above reaction can be performed not only at increased pressures, but can also be advantageously carried out in the neighborhood of atmospheric pressure. In the latter case the reaction starts violently and with the development of considerable heat, and cooling is therefore necessary. Aliphatic hydrocarbons particularly chlorides of hydrocarbons are valuable as solvents in this reaction.

Example

Ethylene was added at atmospheric pressure and at room temperature to a mixture of 5 g. aluminum chloride free from water, 50 g. dichlorethane and 0.7 g. water. The polymerization of the ethylene, accompanied by the development of heat, amounted to 4.8 litres in the first ten minutes, and in the next ten minutes to 2.6 litres, after which it dropped down considerably. In one hour a total of 10 litres of ethylene were polymerized. When water was excluded, the polymerization amounted, in the same period of one hour, to only about one-quarter of that which was obtained by the addition of water as described above. In order to invigorate the reaction, which apparently dies down as a result of the formation of an inactive organic aluminum compound, the same quantity of anhydrous aluminum chloride was added, since the water is not used up. In this way the same quantity of ethylene will again be polymerized in the same period of time. The reaction product was then treated with water, and upon fractionating in vacuum a viscous oil was obtained as the principal product.

The invention claimed is:

1. Process comprising polymerizing ethylene in the presence of an aliphatic liquid hydrocarbon solvent, aluminum chloride and a quantity of water of 0.5 to 2 mols per mol of aluminum chloride.

2. Process comprising polymerizing ethylene in the presence of dichlorethane solvent, aluminum chloride and a quantity of water of 0.5 to 2 mols per mol of aluminum chloride.

3. Process comprising polymerizing ethylene in the presence of an aliphatic liquid hydrocarbon solvent, aluminum chloride and water in the amount of 1 to 2 mols per mol of aluminum chloride.

4. Process comprising polymerizing ethylene in the presence of dichlorethane solvent, aluminum chloride and water in the amount of 1 to 2 mols per mol of aluminum chloride.

5. Process comprising polymerizing ethylene in the presence of a hydrocarbon chloride solvent, aluminum chloride and water in the amount of 1 to 2 mols per mol of aluminum chloride.

6. Process comprising polymerizing ethylene at substantially atmospheric pressure in the presence of an aliphatic liquid hydrocarbon solvent, aluminum chloride and water in the amount of 1 to 2 mols per mol of aluminum chloride.

7. Process comprising polymerizing ethylene in the presence of an aliphatic liquid hydrocarbon solvent, aluminum chloride and water in the amount of 1 to 2 mols per mol of aluminum chloride, and adding water-free aluminum chloride to revivify the reaction when it slows down.

8. Process comprising polymerizing ethylene in the presence of a solvent of the group consisting of aliphatic liquid hydrocarbons and their chlorination products, aluminum chloride and a quantity of water of 0.5 to 2 mols per mol of aluminum chloride.

JOHANN SIXT.